Dec. 14, 1965  R. J. BREJCHA ETAL  3,222,902
ELECTRO-HYDRAULIC FORMING METHOD AND APPARATUS
Filed Dec. 28, 1961  4 Sheets-Sheet 1
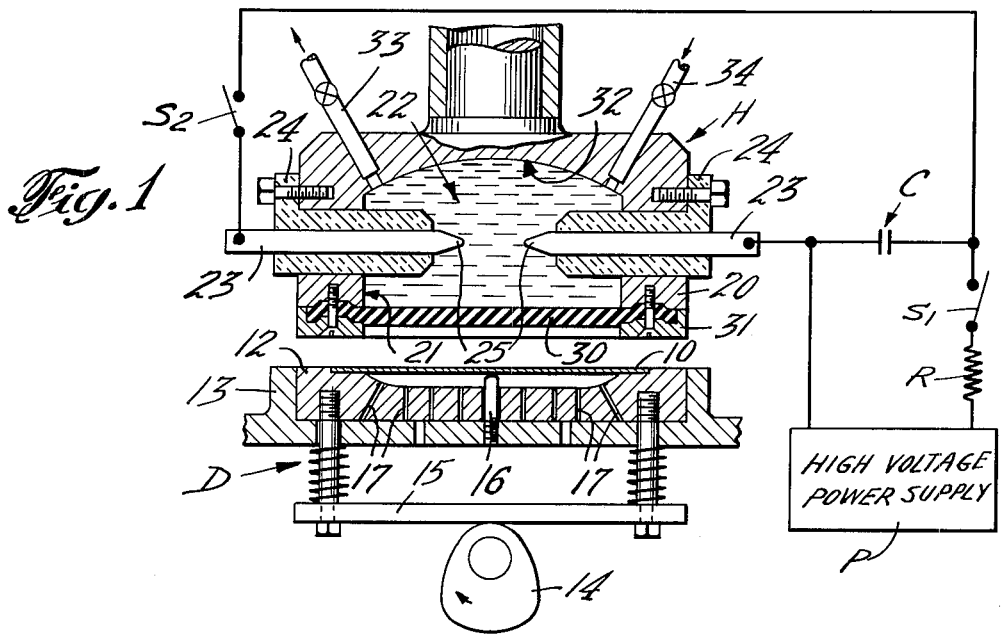
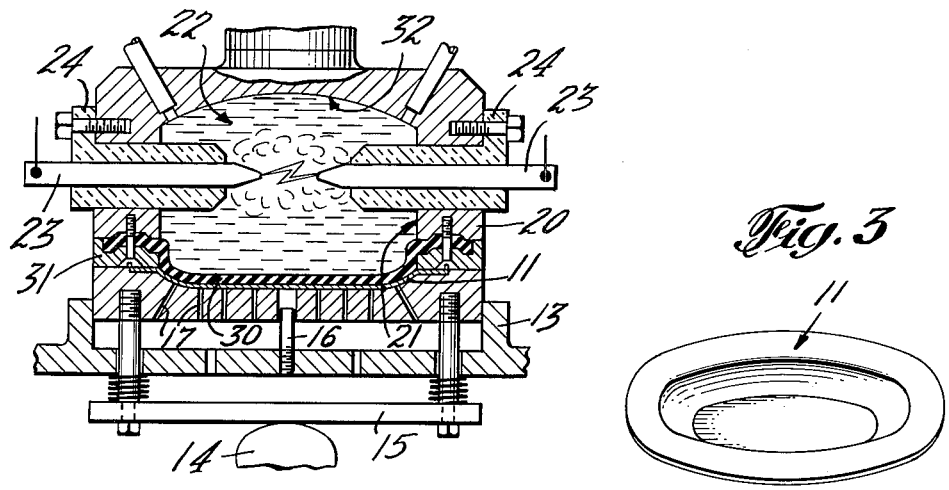
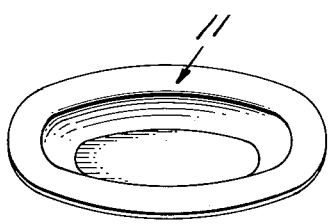
INVENTORS
ROBERT JOHN BREJCHA
SEYMOUR BAZELL
JOSEPH L. RADNIK
BY
George W. Reiber
ATTORNEY

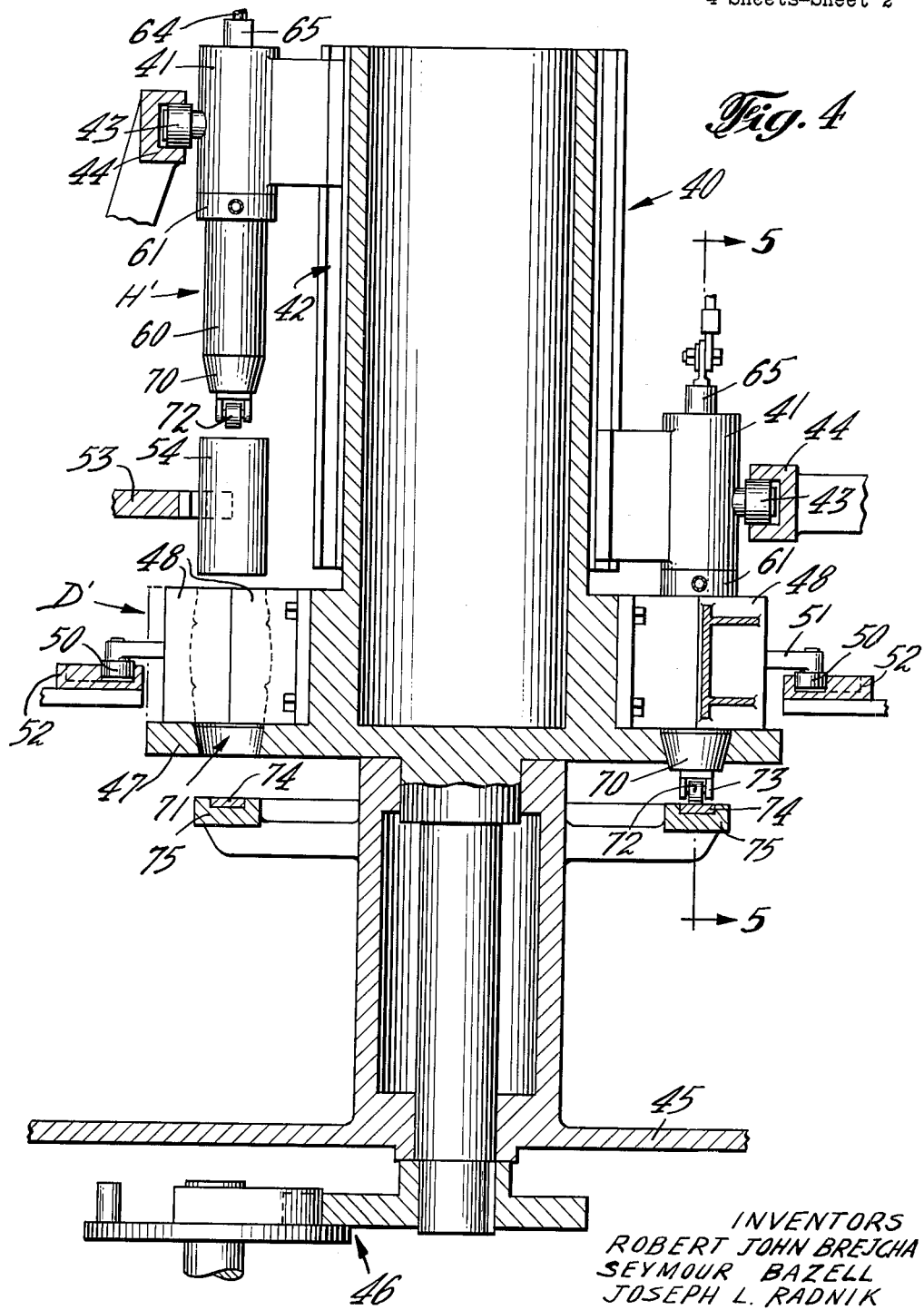

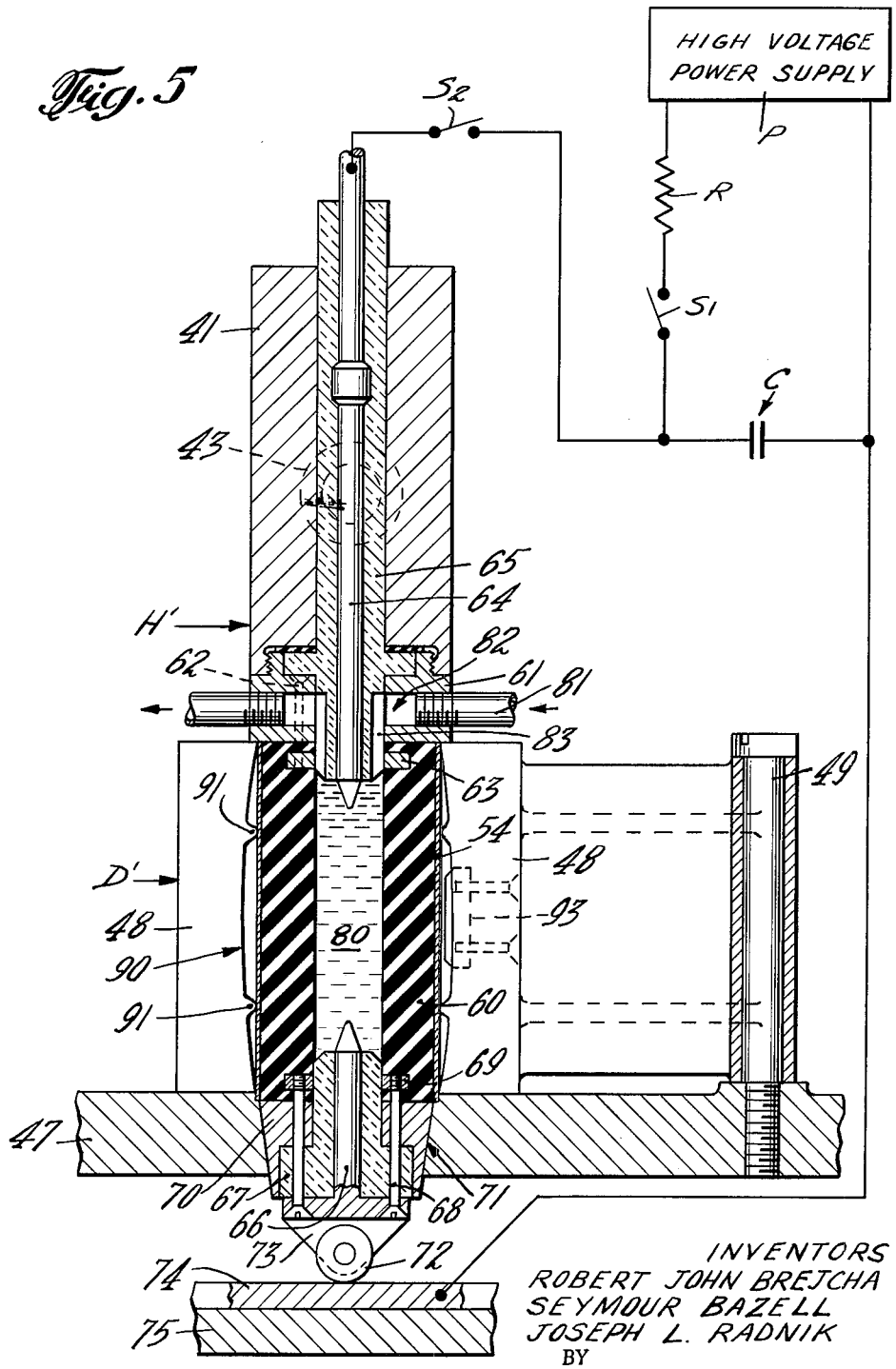

Dec. 14, 1965   R. J. BREJCHA ETAL   3,222,902
ELECTRO-HYDRAULIC FORMING METHOD AND APPARATUS
Filed Dec. 28, 1961   4 Sheets-Sheet 4
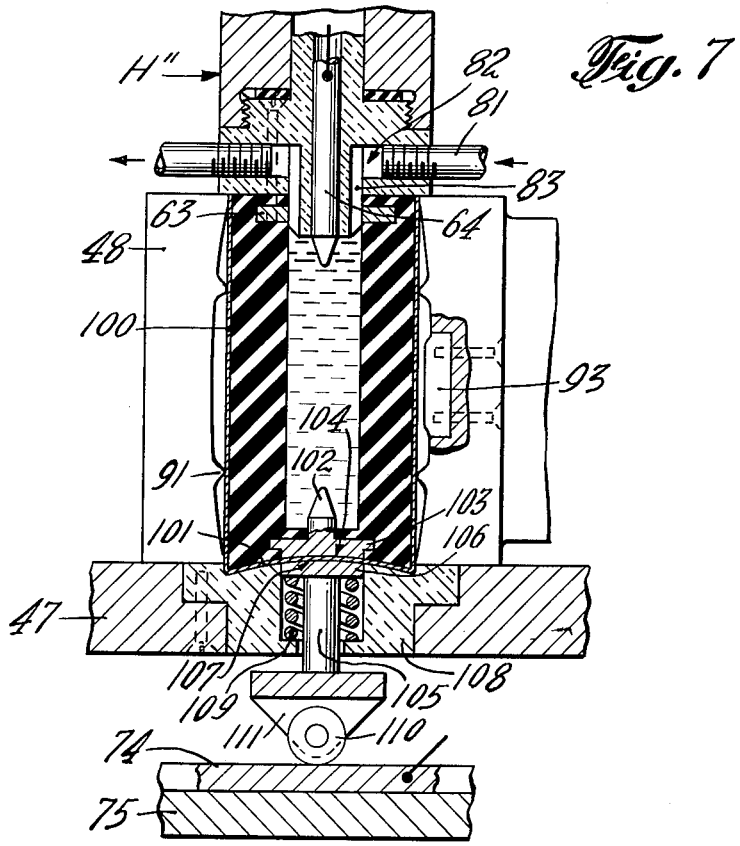
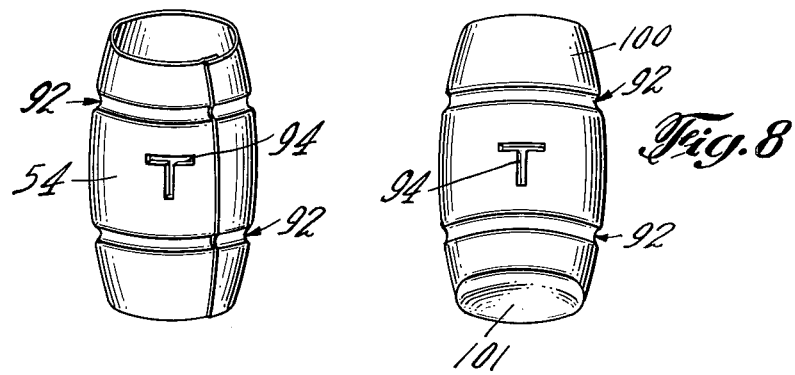
INVENTORS
ROBERT JOHN BREJCHA
SEYMOUR BAZELL
JOSEPH L. RADNIK
BY
George W. Reiber
ATTORNEY United States Patent Office 3,222,902
Patented Dec. 14, 1965

3,222,902
ELECTRO-HYDRAULIC FORMING METHOD
AND APPARATUS
Robert John Brejcha, Westchester, Seymour Bazell, Chicago, and Joseph L. Radnik, Berwyn, Ill., assignors, by mesne assignments, to American Can Company, New York, N.Y., a corporation of New Jersey
Filed Dec. 28, 1961, Ser. No. 162,790
16 Claims. (Cl. 72—56)

This invention relates to a method and apparatus for shaping workpieces of deformable material. More specifically, it pertains to the forming or shaping of a blank of sheet metal and the like by the utilization of the high energy of an electrical discharge in a hydraulic medium. The invention lends itself particularly to the forming and/or shaping of tubular container bodies and the like in high speed production.

The term "electro-hydraulic" as used herein designates the concept of releasing electrical energy in a contained hydraulic environment. This technique may be thought of as direct conversion of electrical energy into mechanical energy in that the high energy shock waves generated in the hydraulic medium by the rapid discharge of a high intensity spark provides an energy front for performing work. Normally, the hydraulic medium is a suitable incompressible fluid and the spark producing means is a pair of spaced electrodes immersed in the fluid. Electrical energy rapidly released from a high energy storage source, such as a bank of capacitors, is discharged across the spaced electrodes. The reaction of this spark discharge in the electrode gap creates tremendous pressure build-ups in the surrounding fluid which transmits the resulting shock waves toward a workpiece suitably mounted to a support or forming die.

Electro-hydraulic forming has many advantages over processes used heretofore. Conventional mechanical forming, for example, is limited to a narrow range of shapes and patterns. Special tooling and involved procedure is required to form workpieces of complicated geometry, and mechanical forming is additionally limited to the pressure levels of available forming presses. Electro-hydraulic forming is more versatile than mechanical forming since an almost infinite variety of difficult configurations may be formed in a single operation. Moreover, the range of working pressures available with an electro-hydraulic process are far greater than in mechanical forming. By increasing the capacity of the energy storage source, almost unlimited amounts of energy can be released to produce working pressures several times that of conventional presses. This energy may be used to form, weld and pierce workpieces all in one operation, if desired.

Another disadvantage of conventional forming methods is the deleterious results often achieved in the physical properties of the workpieces. Uneven forming pressures cause creep, irregular thinning and adverse stressing in many instances where extraordinary drawing of the workpieces is required. This problem is even more acute when materials which do not readily lend themselves to conventional forming practices are used. For example, certain alloys and high tensile strength materials used in industry today are known to be difficult to work. The tendency of these materials to fracture when worked with conventional tools and the requirement of extremely large presses to accomplish satisfactory results have seriously limited the use of these materials for many applications. The high and continuous pressure distributions achievable in electro-hydraulic forming makes this process well suited for these more difficult jobs.

Attempts to overcome the problems of conventional forming by devising hydraulic forming and explosive forming techniques have not been entirely satisfactory. In hydraulic forming, where working pressures are applied externally to a hydraulic medium and transmitted uniformly through the medium to a workpiece, the problems reside in the requirement of presses of excessive size to provide the necessary pressures and in the slowness of the operation. In explosive forming, high pressures are achievable but the process is slow and often extremely dangerous since it does not lend itself well to automation. Moreover, explosive forming is noisy and therefore objectionable in high speed manufacturing operations.

It has been found that many of the shortcomings of these known forming processes can be overcome with the electro-hydraulic technique, since it lends itself well to equipment designed for high-speed, versatile operation and maximum safety.

An important object, therefore, of this invention is to overcome the problems of forming workpieces which are not readily worked by known processes.

Another object of this invention is to provide a method for forming workpieces electro-hydraulically.

Another object of this invention is to provide a method for shaping deformable workpieces electro-hydraulically with a forming head which is self contained and adapted for high speed operation.

Another object of this invention is to provide a method for shaping tubular container bodies to the contour of a forming die electro-hydraulically with a self contained fluid filled forming head adapted for high speed operation without the necessity of filling and emptying the fluid before and after each forming operation.

A further object of this invention is to provide a forming head for electro-hydraulically forming workpieces.

Another object of this invention is to provide an electro-hydraulic forming head which is self contained and adapted for high-speed forming operation.

Another object of this invention is to provide an electro-hydraulic forming head adapted to shape tubular container bodies to the contour of a forming die.

Still another object of this invention is to provide high speed apparatus for electro-hydraulically forming workpieces sequentially.

Yet another object of this invention is to provide an apparatus for electro-hydraulically shaping successively fed container bodies to a forming die.

Numerous other objects and advantages of the invention will be apparent as it is better understood from the following description, which, taken in connection with the accompanying drawings, discloses a preferred embodiment thereof.

To accomplish these and other objects of this invention, there is provided an electro-hydraulic forming head comprising spaced electrodes immersed in an incompressible fluid which is contained within a diaphragm member of elastomeric material. The forming head is positioned over the workpiece with the resilient diaphragm disposed substantially in contiguous relation with the surface of the workpiece. The rapid discharge of electrical energy within the immersing fluid creates high-pressure shock waves which move outwardly through the fluid to force the diaphragm against the workpiece. In this manner, the pressure front moving with the shock waves are received against the diaphragm and converted to mechanical energy either for shaping the workpiece against a die or for performing other work thereon.

Referring to the drawings:

FIG. 1 is a sectional view of one form of the invention showing a workpiece in position before shaping it by the method of this invention.

FIG. 2 is a sectional view showing how the form of the invention in FIG. 1 is used to carry out the method of this invention.

FIG. 3 is a persepctive view of a typical body formed by the practice of this invention.

FIG. 4 is a vertical section of a preferred form of machine in which the invention is embodied.

FIG. 5 is a sectional view taken substantially along lines 5—5 of FIG. 4 showing another form of the invention.

FIG. 6 is a perspective view of a container body shaped by the form of the invention of FIG. 5.

FIG. 7 is a sectional view similar to FIG. 5 showing still another form of the invention.

FIG. 8 is a perspective view of a container body shaped by the form of the invention of FIG. 7.

Referring to FIG. 1, there is shown one embodiment of this invention which may be used for shaping a workpiece or blank 10 of deformable material into a dished body 11 of the type shown in FIG. 3. The blank 10 may be any material capable of permanent deformation; and the invention has been used to shape successfully metal blanks, such as tin plate and aluminum, and certain plastic materials, such as polyethylene and polystyrene. Moreover, it will be understood that the dish-shaped body 11 is just one of many configurations capable of being formed by the invention. Not only may bodies of more complicated geometry be formed by the practice of this invention, but forming, welding and piercing may also be accomplished and all in one operation, if desired.

The blank 10 is shown interposed betwen a die member D and an electro-hydraulic forming head designated generally as H. The die member D and head H are movable relative to each other for interposing and clamping the blank 10 in forming position therebetween. Die member D may be of any desired configuration, but is shown here in simplified form as comprising a female die block 12 carried on a supporting frame 13 and actuatable by a cam 14 engaging a spring-biased lift bar 15. An ejector pin 16 mounted to frame 13 extends centrally of die block 12 to eject the body 11 after the forming operation. Die block 12 is shown containing a plurality of vent holes 17 extending into the die cavity. The function of these vent holes is to permit evacuation of the air trapped between the blank and the die block during the forming operation, as will hereinafter be more fully explained.

It will be understood that blank 10 can also be free formed without the use of die member D. For example, in those instances where the forming operation calls only for bulging the blank into a generally curvilinear configuration, a die is unnecessary and only a retaining ring for clamping the blank to the forming head H would be required. This latter practice may find use in the forming of such items as automobile hub caps, container ends, dish ware, etc.

The forming head H is a major aspect of this invention and will now be described in detail. It comprises a block member 20 in which a cavity 21 has been formed. This cavity is filled with a hydraulic medium 22, preferably an incompressible fluid. Ordinary tap water has been found suitable for many types of forming, but it will be understood that other hydraulic fluids may serve just as well. However, in those instances where the operating electrical energy levels are critical, higher efficiencies may be achieved with fluids of greater electrical conductivity and ionization characteristics than water.

A pair of electrodes 23 are mounted in the wall of block member 20 in insulators 24 and extend into the cavity 21. The electrodes are thus immersed in the fluid 22 within the cavity. The actual number and spacing of electrodes may vary, according to the particular job to be performed by head H, but in the form shown a single pair having tips 25 in opposed spaced relationship constitutes the preferred form of the invention.

The electrodes may be of any suitable conductor material, such as beryllium copper rod, but a material should be selected having the highest possible conductive properties as well as ruggedness and durability. The insulators 24 must also be of a durable material, and Teflon is one such material which has been found especially satisfactory for the operating conditions present in electrohydraulic forming.

The spacing of the electrodes and the geometry of the electrode tips play important roles in the invention. The length of the gap between tips 25 should be sufficient to ensure complete formation of the spark discharged therebetween and for the formation of uniform wave fronts across substantially the full width of the cavity 21. This ensures maximum utilization of the available energy released by the discharge. On the other hand, the tip spacing must be less than the distance between either tip and the surrounding metal walls of the cavity to avoid shorting to these walls. Any tendency of the electrical charge to jump to these walls disrupts the formation of the wave fronts in fluid 22 and lowers the effectiveness of the operation and, in some instances, could ruin the blank 10. Therefore, the electrodes 23 must be carefully spaced to overcome these problems.

Electrode tip geometry is related to these problems. Experimentation has indicated that the uniformity of spark discharge and resulting wave formation may vary substantially with changes in tip geometry. It has been found that best results are achieved where the tips are shaped to prevent any tendency of the spark to stray over the surface of the electrode; i.e., to initiate from first one point on the electrode tip and then another. In the form of the invention shown, electrode tips 25 are tapered to a rounded point at their very end. This geometry has been found to give effective control over the shape of the shock wave formed in the gaseous conductive channel or gap between the electrode tips and therefore achieves greater continuity in pressure distribution in the forming head.

The electrodes 23 are connected to the terminals of a high voltage power supply. The type of electrical circuit used in the invention is not important, but it will be understood that the power rating of the electrical source must correspond to the energy requirements of the forming process. This is, the circuit must be capable of a rapid discharge of energy commensurate with the work to be accomplished in any one cycle of operation. Moreover, the power rating of the electrical source is directly related to the rate of operation. In other words, forming rate in terms of available charging time and rate of spark discharge are variables in the determination of the rating of the power source for a particular job requiring a given energy level.

One form of electrical circuit which may be used in the instant invention is illustrated schematically in FIG. 1. The equipment embodied in this circuit includes a high voltage D.-C. transformer rectifier power source P connected to a bank of capacitors designated generally as C. The capacitors constituting bank C may be wired in series-parallel and may vary in number, of course, depending upon the total net capacity requirements of the circuit. In the way of illustration, the average power requirements for electro-hydraulically forming small sheet metal container parts at an estimated rate of 500 parts per minute was determined to be 45–60 kw. This determination was based on a three to four electrical-discharges-per-cycle operation, with the energy requirement per discharge being approximately 1800 joules. From this, the rate of voltage build-up and the necessary charging current can be estimated for achieving a final capacitor voltage in the neighborhood of 60 kv. corresponding to the quantity of energy required when stored in a capacitor bank rated at one microfarad. This power requirement is based on a condition of constant current charging, which is considered to be most desirable from the standpoint of power supply life and reliability. It will be appreciated that more rapid discharge may be achieved by reducing the capacitance of the storage bank C. This must be accompanied by an increase in voltage if the same energy is to be discharged. It will be readily understood by those skilled in the art that any number of capacitance-voltage combinations could be used to achieve the desired energy levels and that circuit configurations could be arranged for varying the capacitance over a substantial range to fulfill different job requirements.

Also included in the circuit illustrated in FIG. 1 is a pair of switches $S_1$ and $S_2$. $S_1$ is the switch for charging the capacitor bank C from the power supply. Once the required capacitor voltage is reached, $S_1$ is opened to isolate bank C, whereupon $S_2$ is closed to release the energy stored in the bank across electrodes 23. The characteristics of $S_1$ are not critical; but since the strength of the shock waves created by the discharge across electrodes 23 is dependent upon the rate of energy dissipation in the gap, switching losses attributable to $S_2$ must be kept at a minimum to ensure more rapid discharge and higher efficiencies. This switch must have low loss, rapid switching time, and the ability to withstand full voltage during the charging time. Mechanical switches are much too slow, of course; therefore, electronic switching is desirable. Types of switches possessing the desirable characteristics and which may be suitable for high speed production equipment include the triggered spark gap, hydrogen thyratrons, ignitrons, and possibly solid-state controlled rectifiers.

The circuit may also include a resistor R in series with the capacitor bank C. This resistor acts as a current limiter during the charging of bank C.

A vital part of the forming head H is an elastomeric diaphragm 30 which is suspended across the open end of cavity 21 and secured in fluid tight engagement with block member 20 by a retaining ring 31. This diaphragm may be of any impermeable material but is preferably natural rubber or a rubber derivative. The functions of rubber diaphragm 30 are several. Its primary function is to act as a shock attenuator or, stated differently, to attenuate the adverse shock wave and implosion effects resulting from collapse of the electrical spark at the time of discharge. Experiments in forming certain workpiece configurations have indicated that severe inward buckling occurs locally in the walls of the workpiece instead of a desired uniform bulging. This has been attributed at least in part to the collapse or disintegration of the electrical spark in the gaseous channel between the electrode tips at the time of discharge, creating an implosive condition within the hydraulic fluid and tending to cause forces of brief duration to act on the walls of the workpiece opposite than what is intended. The phenomenon of implosion in electro-hydraulic forming is not yet fully understood, but its adverse effects have been virtually eliminated by the use of the rubber attenuator or diaphragm 30.

The thickness of the rubber diaphragm used in this invention will vary, depending on the nature of each forming job and the implosion problem to be corrected. For simple forming operations on thin metal container parts, diaphragms of one-half to three-quarter inch thickness have demonstrated satisfactory attenuating results. It will be appreciated, however, that the thickness of the attenuator 30 need not be uniform. In fact, in some instances, it may be desirable to use a diaphragm of special contour to achieve a more uniform shock wave distribution in the fluid.

Diaphragm 30 performs other functions contributing to the success of the instant invention. It serves as a secondary transmitting medium which performs the actual shaping of the blank 10. That is, the energy carried by shock waves through fluid 22 is converted to mechanical energy by the diaphragm which reacts to the pressure fronts in the fluid to deform blank 10 into a desired shape.

Being mounted over the open end of cavity 21 as shown, diaphragm 30 also provides a convenient means for containing the fluid within the cavity. This function is of paramount importance from the standpoint of forming rate and safety of the operation. It avoids having to evacuate and refill the cavity with fluid between cycles, which means that the forming head H is essentially self-contained and capable of cyclic operation at high rates of speed. Thus, the shortcomings of explosive forming, as mentioned hereinbefore, is overcome with a simple construction having all the necessary components, including the hydraulic fluid, contained in the one unit. Moreover, the hazard of dangerous stray currents which could result if the fluid were allowed to leak and short the electrodes to exposed external machine members is entirely eliminated, since diaphragm 30 is impermeable and is sealed in fluid tight engagement with block member 20 as hereinbefore explained.

Another and no less important function of rubber diaphragm 30 is that of an insulator for the electrical fields within the forming head H. It will be appreciated that in those forming operations where it is desirable to use a large gap length between electrodes to achieve broader pressure distribution in the fluid, a point is reached where arcing to the workpiece may occur rather than across the electrodes. Since rubber is an excellent electrical insulator, the presence of diaphragm 30 between the electrodes and the workpiece removes any tendency for arcing or shorting to the workpiece.

Another feature of this form of the invention is in the geometry of the closed end of cavity 21. As shown in FIG. 1, the wall closing the end of the cavity may be concave and of a general paraboloidal contour. This provides a reflector surface 32 which, in some instances, may be desirable to control the formation and propagation of the shock waves in fluid 22. For example, where the shape of the cavity 21 is such that the wall surfaces defining the cavity interfere with a uniform and symmetrical distribution of forces throughout the fluid, a portion of this wall may be appropriately shaped to direct more effectively the forces toward and against the workpiece. Reflector surface 32, therefore, is a means for controlling the force distribution of the radiating shock waves in fluid 22 and thus bring a maximum amount of the energy released by the electrical discharge to bear on the workpiece.

Means are shown in FIG. 1 for controlling the supply of fluid 22 within cavity 21. Valve controlled inlet and exit lines 33, 34 communicate with the cavity and lead to and from a supply reservoir, not shown. The function of these supply lines primarily is to circulate the fluid from time to time and to maintain a definite volume of fluid in the cavity. This is necessary because after a great many cycles of operation, successive electrical discharges have drastically altered the physical properties and raised the temperature of the fluid. These conditions may adversely affect the efficiency and performance of the forming operation as well as damage the diaphragm 30 and other components of the unit. Therefore, it is desirable that the hydraulic fluid be replaced at least periodically or, if desired, a system for continuous recirculation may be employed.

Having thus described one form of an electro-hydraulic forming apparatus, the process of shaping the blank 10 with this form of the invention can be comprehended by referring to FIG. 2. Having placed blank 10 in position on forming die D and brought the forming head H into clamping position over the blank, switch $S_2$ is closed to release the energy stored in capacitor bank C. Instantly a high intensity spark leaps the gap between electrodes 23, initiating within fluid 22 high energy shock waves which move outwardly through the medium and toward diaphragm 30 disposed immediately above blank 10. As the wave fronts reach the diaphragm, it yields under the high pressure of the fluid to force blank 10 into the die cavity. The result is a dish-shaped article 11 of the type shown in FIG. 3. Thereafter, the die member and forming head are separated to eject the completed article from the die (see FIG. 1).

As mentioned hereinbefore, it is desirable in those operations using the die member D to evacuate or vent the air trapped between the blank 10 and the die cavity. This is so because of the extremely high speed at which electro-hydraulic forming takes place. The deformation of the workpiece is so rapid that the dead air in the die cavity cannot escape around the deformed blank, as in some punch or deep draw forming methods, but is trapped in the cavity and compressed to very high pressures. This interferes with the proper forming of the workpiece tending to cause it to buckle locally away from the die cavity. Unless this compressed air is removed faster than the build up of pressure in the cavity, irregular and incomplete forming results in those regions of trapped air pockets. Several means may be employed for venting the die cavity. A vacuum system for evacuating the cavity may be used, if desirable, but this system may have some disadvantages in a high speed forming operation. In the form of the invention illustrated in FIGS. 1 and 2, die evacuation may be accomplished by venting the die cavity to atmosphere. A plurality of vent holes 17 may be formed in the die member D in sufficient quantity and distribution to achieve adequate venting. This simple construction has been found satisfactory for forming less complex workpieces, such as the dish shaped article shown in FIG. 3. However, where the shape of the workpiece and corresponding die cavity is such that venting through vent holes is too slow, as, for example, where the path of the escaping air is more irregular, another form of die venting may be more feasible. In such instances, a porous die made of sintered fibre or powder metal may provide a more efficient means for rapid evacuation of the die cavity.

Turning now to FIG. 4, there is illustrated another form of the invention incorporated in a machine adapted for high speed production forming of container body blanks. A forming head $H^1$ is mounted for reciprocation on a rotating turret 40. Depending on the production rate desired of this particular machine, a plurality of heads $H^1$ may be spaced about the turret and carried in supports 41 which operate in slide ways 42 mounted on the turret. Rollers 43 operating in cam track 44 mounted on the machine main frame 45 control the reciprocation of the heads $H^1$ in time with rotation of turret 40. The turret is driven in intermittent motion by a suitable drive mechanism, such as a Geneva drive, designated as 46.

Turret 40 is provided with a table 47 on which is mounted a plurality of die members $D^1$ equal in number to the forming heads $H^1$. Each die member comprises a pair of female die blocks 48, one of which is pivotally mounted to table 47 with a pin 49 (see FIG. 5). The other die block is rigidly bolted to the turret in mating relation with the pivoted die block. A roller 50 mounted on a bracket 51 fixed to the pivoted die block moves in an annular cam track 52 to open and close the die member in time with rotation of turret 40.

A feed wheel 53 is rotatably mounted at a feed station above the path of the die members $D^1$. This feed wheel revolves in intermittent registry with turret 40 to bring a container body blank 54 into alignment with a die member $D^1$ at the feed station. Bank 54 may be formed from flat stock with a longitudinal side seam on a conventional can body maker. The strength of the side seam, of course, must be sufficient to withstand the forming stresses imparted to the wall of the blank; and it has been found that lap welded side seams, for example, possess adequate strength for electro-hydraulic shaping the blank 54 without any tendency for the seam to rupture or fracture when drawn. Simultaneously with the alignment of blank 54 with die member $D^1$, the forming head $H^1$ located immediately above this die member descends to pass through the blank 54, stripping it from feed wheel 53 and carrying it downwardly into the die member $D^1$. The turret 40 is then indexed step by step to a forming station where the body blank 54 is electro-hydraulically formed to the desired shape.

The forming station is located on the right hand side of the machine as seen in FIG. 4. The relationship of the machine components at the forming station is best illustrated in FIG. 5, which is a sectional view taken through a portion of the machine at the forming station. In this view, the container body blank 54 is shown disposed within the die member $D^1$ with the forming head $H^1$ inserted within the body blank.

The forming head $H^1$ itself comprises a tubular rubber diaphragm 60 mounted to the reciprocable support 41 by means of a retaining nut 61 which is threaded into the lower end of support 41. Diaphragm 60 is held to the support by screws 62 which extend through nut 61 into a ring 63 imbedded below the upper end of the diaphragm. An electrode 64 encased in an insulator 65 extends centrally of support 41 and nut 61 into gripping engagement within the upper end of diaphragm 60.

Another electrode 66 is mounted in gripping engagement within the opposite end of tubular diaphragm 60. This electrode is encased in an insulator 67 and is held to the diaphragm by bolts 68 which extend through the electrode and insulator into another ring 69 imbedded just above the lower end of the diaphragm. A tapered steel guide block 70 surrounds the electrode 66 and insulator 67 and is adapted to seat within a tapered opening 71 in table 47 to lock the forming head in alignment with the die member.

A roller contact 72 mounted on a bracket 73 formed integrally with electrode 66 projects below table 47 to make electrical contact with a conductor 74. Conductor 74 is mounted in a track 75 supported from the machine frame beneath the turret table 47 (see FIG. 4). Conductor 74 is annularly aligned with the indexing path of the turret 40 and, if desired, may extend around the axis of the machine to provide electrical contact at several successive stations for reasons to be hereinafter explained.

An electrical circuit identical in all respects to the one hereinbefore described is connected across electrode 64 and conductor 74. In this way, the circuit is completed through roller contact 72 to the opposite electrode 66 when the forming head $H^1$ is lowered completely into the die member $D^1$ with guide block 70 seated firmly within opening 71.

The interior of tubular diaphragm 60 is filled with a hydraulic fluid 80 which completely fills the interior cavity between the electrodes and immerses the tips of the electrodes. As hereinbefore explained, it is occasionally necessary to circulate the supply of fluid 80 in the diaphragm, and this may be done by supply lines 81 communicating with the cavity through ports 82 in the retaining nut 61 and passages 83 formed in the insulator 65. With the ends of diaphragm 60 tightly engaging nut 61 and guide block 70, respectively, and with the encased electrodes 64, 66 snuggly inserted within the ends of the diaphragm, the fluid 80 is sealed within the diaphragm against escape. The resilience of the rubber diaphragm ensures a fluid-tight compartment even after prolonged operation of the forming head.

There is thus illustrated a completely self-contained forming head $H^1$ which operates as a unit in a machine adapted for high speed forming operation. In this form of the invention, the forming head $H^1$ is capable of rapid reciprocation to pick up a container body blank at a feed station, move inwardly of the blank to strip the blank from the feed means, and move the blank downwardly into a die member with the blank appropriately interposed between the forming head diaphragm and the die cavity. With the electrodes and hydraulic fluid carried as a unit with the forming head, forming of the blank may be neatly and safely accomplished without time consuming filling of the blank with fluid and without the attendant danger of splashing and shortcircuiting.

The die cavity in each die member $D^1$ as shown in FIG. 5 is adapted for shaping the container body blank 54 into a generally barrel-shaped configuration. The interior wall of each die block 48 is formed with a curvilinear surface 90 increasing in diameter from each end of the die member toward the middle. The surface 90 in one die block is, of course, symmetrical with the same surface in the mating die block.

A plurality of inwardly projecting ribs 91 may be formed in each surface 90 as desired, to provide reinforcing or stiffener beads 92 in the wall of the shaped body, as illustrated by the completed container body shown in FIG. 6. Ribs 91 may be either integrally formed in wall surfaces 90 or may be in the form of separable inserts which are attached to the walls of the die cavity. Similar inserts, such as shown at 93, may also be used to form decorative patterns, labels and/or identification marks, in the wall of the container body. Typical of this type of marking in the intended identification mark 94 shown in FIG. 6. As in the case of ribs 91, the inserts 93 may also be formed integrally with wall surfaces 90. However, it is preferred that these inserts be separable so as to permit the use of the same die members for the forming of a wide variety of surface configurations. Accordingly, inserts of various patterns may be bolted or otherwise mounted in slots appropriately placed in the walls of the die cavity.

The material of inserts 93, and also that of ribs 91 if the latter are in the form of separable inserts, need not necessarily be as hard and rigid as the die members themselves. Experiments with various materials for inserts have indicated that satisfactory intended patterns may be accomplished with softer materials. Rubber and fibre inserts have been used successfully with a high degree of pattern clarity. Apparently, the extreme rapidity with which electro-hydraulic forming takes place, coupled with the favorable continuous pressure distributions present in the forming head, accounts for the success of these softer insert materials. Notwithstanding the tendency of such inserts to become rounded at the edges as wall of the body blank is deformed thereover, they have been found to hold up very well after prolonged operation while still providing indentations of satisfactory depth and clarity. The obvious advantages of these softer materials are that a wider variety of inserts are provided more cheaply than metal inserts, the type or set is more easily formed in the inserts, and the yieldable nature of the softer inserts helps to avoid excessive stressing of the wall of the container body as it is drawn over and around the insert type.

Die members $D^1$ are also provided with means (not shown) to evacuate the air trapped in the die cavity. Evacuation may be accomplished either by a vacuum system or by using vented or porous die blocks, as hereinbefore described.

Returning now to a description of the operation of the form of the invention illustrated in FIG. 5, the forming head $H^1$ has descended entirely through die member $D^1$ so that the body blank 54 with diaphragm 60 therein rests in the die cavity and guide block 70 engages within opening 71 to lock the parts in alignment. In this position, roller contact 72 has been lowered into engagement with conductor 75 and pivoted die block 48 is held firmly against fixed die block 48 by roller 50 operating in track 51. By a suitable control means (not shown), $S_1$ is opened and $S_2$ closed to release the electrical charge stored in capacitor bank C.

The energy released by the resulting discharge across electrodes 64, 66 is transmitted by the shock waves thus created in fluid 80 outwardly against tubular diaphragm 60. The diaphragm instantly expands under the influence of the tremendous pressures within to deform body blank 54 to the contour of surfaces 90. Thereafter, head $H^1$ is withdrawn from the die member and hinged die block 48 is swung away to expose the completed body, which may then be ejected from the die member by a suitable ejector means (not shown).

In the event that more than one discharge of electrical energy is necessary or desired in the forming operation, the means for controlling the operation of switches $S_1$ and $S_2$ can be synchronized with the turret drive to effect successive discharges. If desired, these successive discharges may all occur while the turret is at one position or station. However, the time required for operating the switches and charging the capacitor bank C after each discharge would drastically reduce the speed of the machine if all discharges are accomplished at one fixed station. Higher speeds and more efficient distribution of switching and charging time are achieved by providing that the successive discharges take place during the interval the turret is being indexed from one station to the next. That is, the speed of the machine may be regulated so that the desired number of discharges takes place during the interval of time that the turret moves between stations. The only requirement is that conductor 74 extend for at least the same annular distance between stations so that a complete circuit is maintained for as long as it takes the turret to move this distance. For this reason, conductor 74 is shown in FIG. 4 as extending at least a considerable distance around the machine in direct alignment below the path of the turret. Thus, as the turret rotates the roller contact 72 maintains electrical contact with conductor 74 for as long as necessary to release the desired number of discharges in head $H^1$.

It will be understood that the energy released in each successive discharge of the electrodes may be adjusted to any desired magnitude by means of appropriate circuit controls synchronized with the rotation of the machine. In this manner, the energy of each succeeding discharge may be raised or lowered, as desired, depending on the nature of the specific forming operation. For example, the most efficient forming cycle for a particular container body may call for three or four successive discharges of diminishing energy magnitude, in which case the control circuit may be arranged so as to adjust the voltage level of the capacitor bank C at appropriate intervals in the forming cycle.

Referring now to FIG. 7, there is shown another form of the invention which is specifically adapted for reshaping drawn container body blanks 100 closed at one end. There is shown a forming head $H''$ which is identical in all respects to head $H^1$, just described, except for the lowermost electrode. Since the bottom end of the drawn body blank 100 is closed, usually in the form of a recessed or concave end panel 101, which prevents moving the forming head completely through the body blank as with the open-ended body blanks illustrated in FIG. 5 another arrangement is needed for bringing the lower electrode in the forming head into circuit. In the arrangement shown, a lower electrode 102 is secured in the lower end of the tubular diaphragm by an integral lip 103 imbedded in the diaphragm.

The lower surface 104 of the electrode is contoured to conform substantially to the interior surface of the end panel of body blank 100.

A contact element 105 having a rounded head portion 106 is mounted to table 47 of the turret in axial alignment with head $H''$. The upper surface 107 of head portion 106 is contoured to conform substantially to the exterior surface of the end panel of the body blank. Element 105 is slidably encased in a well in an insulator housing 108 which in turn is bolted to turret table 47. The upper surface of the insulator housing surrounding head portion 105 is recessed to accommodate the lower end of body blank 100. A coil spring 109 surrounding the contact element 105 in the well biases the element upwardly into pressed engagement with the end panel of body blank 100. Electrical contact is thus made from the upper contoured surface of head portion 106 through the end panel 101 to the lower contoured surface 104 of electrode 102. A roller contact 110 similar to that carried by forming head $H^1$, described hereinbefore, is mounted to the lower end of contact element 105 on a bracket 111 to make electrical contact with conductor 74.

In operation, forming head H" descends into body blank 100 to strip it from the feed means and carry it into the die cavity. As the blank descends through the die cavity, it depresses contact element 105 against the pressure of spring 109 and comes to rest against insulator housing 107. Due to the action of spring 109, element 105 is held firmly against the end panel 101 to ensure good electrical contact. At this point, the control means operating switches $S_1$ and $S_2$ energizes the circuit to discharge the electrodes. The spark initiation and resulting shock waves is in all respects identical, of course, to that described in connection with forming head $H^1$.

The resulting container body illustrated in FIGURE 8 is typical of the many configurations which may be formed in this manner from drawn body blanks. It will be understood, of course, that in the practice of this form of the invention, the container itself must be of an electrically conductive material. Drawn steel or aluminum bodies are typically suited for this operation. However, drawn bodies of plastic or other non-conductive material could also be formed in this manner if the end panel 101 were pierced or otherwise altered to obtain electrical contact between electrode 102 and contact element 106. An example of a drawn container body of non-conductive material which might be suitable for this type of forming is that used in gas-propelled dispensing containers, where the closed end panel is conventionally pierced to allow insertion of a propellant and thereafter plugged with a rubber stopper or the like. In this type of drawn body, the gas hole would conveniently accommodate a contact element 106 tailored to fit through the hole to make electrical contact with electrode 102.

It is thought that the invention and many of its attendant advantages will be understood from the foregoing description and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. A forming head mechanism for electro-hydraulically shaping a tubular container body in a forming die comprising a support movable relative to said die, a tubular elastomeric member insertible within said body and mounted on said support, an electrode having an exposed tip mounted within each end of said elastomeric member and defining therein a container, an energy transmitting medium within said container, said electrode tips being immersed in said medium and being spaced apart a predetermined distance, and contacts on said electrodes externally of said elastomeric member and connected to an electrical power source which selectively discharges electrical energy across said electrode tips whereby shock waves are created within said medium which propagate outwardly from said electrodes and transmit energy to said elastomeric member for shaping said container body to the contour of said die.

2. The mechanism of claim 1 wherein said tubular elastomeric member is impermeable rubber of substantial thickness.

3. The mechanism of claim 1 wherein said tubular elastomeric member has a geometry substantially the same as the interior of said container body.

4. The mechanism of claim 1 wherein the geometry of said electrode tips tapers toward a rounded point.

5. The mechanism of claim 1 wherein said medium is an incompressible hydraulic fluid.

6. The mechanism of claim 5 including means communicating with the interior of said elastomeric member for replenishing the supply of fluid therein.

7. A forming head mechanism for electro-hydraulically shaping a tubular open end container body in a forming die comprising a support movable relative to said die, a tubular impermeable rubber diaphragm secured at one end to said support in fluid tight engagement, said diaphragm having exterior geometry substantially the same as the interior of said body and being insertible therein, a pair of electrodes tightly inserted within the opposite ends of said diaphragm with their tips projecting inwardly of said ends in predetermined spaced alignment, one of said electrodes extending through said support and the other being secured in fluid tight engagement to the opposite end of said diaphragm, a hydraulic fluid contained within said diaphragm immersing said electrode tips, a conductor leading from said one electrode and connected to a terminal of an electrical power source, and a contact member on said other electrode projecting outwardly of said diaphragm adapted to contact a conductor connected to another terminal of said power source to complete an electrical circuit through said electrodes for discharging electrical energy across said electrode tips whereby shock waves are created within said fluid which propagate outwardly and expand said diaphragm to shape said body to the contour of said die.

8. An apparatus for electro-hydraulically shaping tubular container body blanks comprising a die member having a cavity for receiving said blanks one at a time; a forming member movable relative to and within said die member for interposing a body blank therebetween, said forming member including a tubular impermeable elastomeric diaphragm of exterior geometry substantially the same as the interior of said body blank and being insertible therein, spaced electrodes inserted within opposite ends of said diaphragm with their tips projecting interiorly of said diaphragm in predetermined spaced alignment, and a hydraulic medium contained within said diaphragm immersing said electrode tips; an electrical power source adapted for connection with said electrodes; and control means for bringing said electrodes into circuit with said power source when a blank is interposed between said diaphragm and said cavity to discharge electrical energy across said electrode tips whereby high pressure shock waves are created in said medium which transmit energy outwardly to expand said diaphragm and shape said blank to said cavity.

9. The apparatus of claim 8 wherein said die cavity is in the form of a curvilinear barrel-shaped body.

10. The apparatus of claim 8 wherein said die member includes inserts in the walls of said cavity for forming indented surface patterns in the wall of said body blank.

11. An apparatus for electro-hydraulically shaping hollow tubular container body blanks comprising a die member having an open-ended cavity for receiving said blanks one at a time; a forming member movable relative to and within said die member for interposing a body blank therebetween, said forming member including a tubular impermeable elastomeric diaphragm of exterior geometry substantially the same as the interior of said body blank and being insertible therein, a hydraulic medium contained within said diaphragm, and a pair of spaced electrodes inserted within opposite ends of said diaphragm with their tips immersed in said medium in predetermined spaced alignment, each of said electrodes having contacts externally of said diaphragm adapted to extend beyond the ends of said blank when said diaphragm is inserted therein; conductors of an electrical power source spaced from each end of said die member engageable with said contacts when said forming member is in position within said die member; and control means for bringing said electrodes into circuit with said power source when a blank is in position in said die cavity for discharging electrical energy across said electrode tips whereby high pressure shock waves are created in said medium which transmit energy outwardly to expand said diaphragm and shape said blank to said cavity.

12. A method of shaping tubular container body blanks electro-hydraulically in a forming die comprising the steps of maintaining a supply of hydraulic medium in a tubular elastomeric diaphragm of exterior geometry substantially the same as the interior of said blanks with spaced electrodes immersed in said medium, feeding said blanks one at a time into said die with said diaphragm inserted within the blank in said die and bringing said electrodes into circuit with an electrical power source for discharging electrical energy across said electrodes whereby high pressure shock waves are created in said medium which transmit energy outwardly to expand said diaphragm against said blank and to deform said blank to the contour of said die.

13. The method of claim 12 wherein the contour of said die is that of a curvilinear barrel-shaped body.

14. The method of claim 12 wherein the contour of said die includes embossed portions for forming surface indentations in the wall of said blank.

15. A method of electro-hydraulically shaping hollow tubular container body blanks having both ends open in an open-ended die comprising the steps of maintaining a supply of hydraulic medium in a tubular elastomeric diaphragm of exterior geometry substantially the same as the interior of said blanks with spaced electrodes immersed in said medium, feeding said blanks one at a time into said die with said diaphragm inserted therein, extending said diaphragm completely within the length of said blank so that said electrodes make contact with conductors of an electrical power source spaced from each end of said die, and energizing said power source to discharge electrical energy across said electrodes whereby high pressure shock waves are created in said medium which transmit energy outwardly to expand said diaphragm against said blank and deform said blank to the contour of said die.

16. A method of electro-hydraulically forming drawn container body blanks having closed bottom ends in a forming die comprising the steps of maintaining a supply of hydraulic medium in a tubular elastomeric diaphragm of exterior geometry substantially the same as the interior of said blanks with a pair of spaced electrodes immersed in said medium, feeding said blanks one at a time into said die with said diaphragm inserted therein, extending said diaphragm completely within the length of said blank so that one of said electrodes comes into electrical contact with the closed bottom end of said blank, and bringing said end and the other of said electrodes into circuit with an electrical power source for discharging electrical energy across said electrodes whereby high pressure shock waves are created in said medium which transmit energy outwardly to expand said diaphragm against said blank and deform said blank to the contour of said die.

References Cited by the Examiner

UNITED STATES PATENTS 2,559,227   7/1951   Riebel _____ 113—44

OTHER REFERENCES

"Explosives Form Space Age Shapes," published in Steel, August 25, 1958, pp. 82–86 relied on.

"Hydrospark Forming," published in The Tool Engineer, March 1960, pp. 81–86 relied on.

CHARLES W. LANHAM, *Primary Examiner.*

NEDWIN G. BERGER, WILLIAM J. STEPHENSON,
*Examiners.*